Jan. 8, 1963    Y. H. DALLE    3,072,512
STRETCHABLE REINFORCED SHEET MATERIAL
Filed Nov. 25, 1959    2 Sheets-Sheet 1
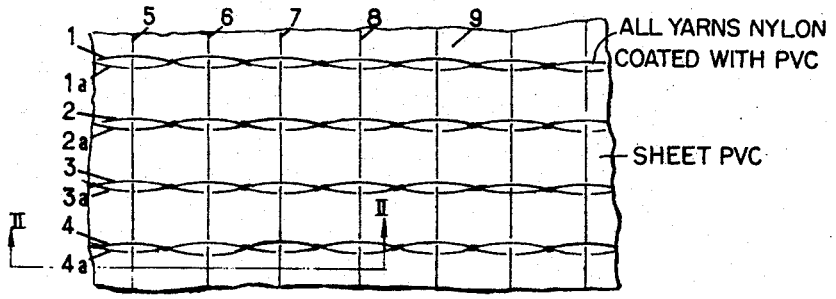
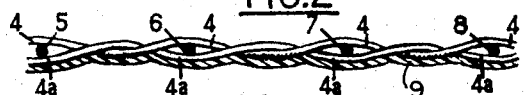
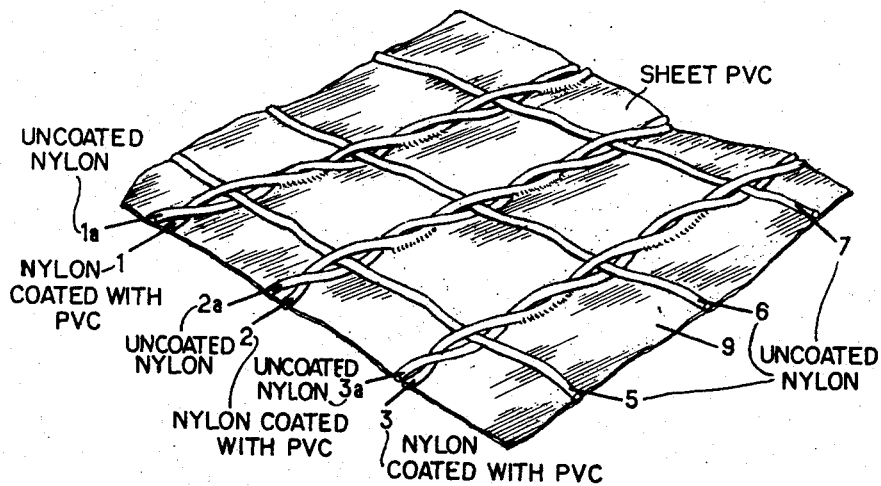
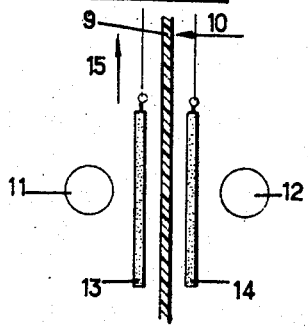
INVENTOR
Yves H. Dalle
ATTORNEYS Jan. 8, 1963 Y. H. DALLE 3,072,512
STRETCHABLE REINFORCED SHEET MATERIAL
Filed Nov. 25, 1959 2 Sheets-Sheet 2
FIG.6
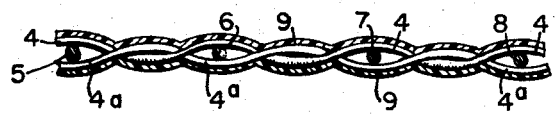
FIG.4
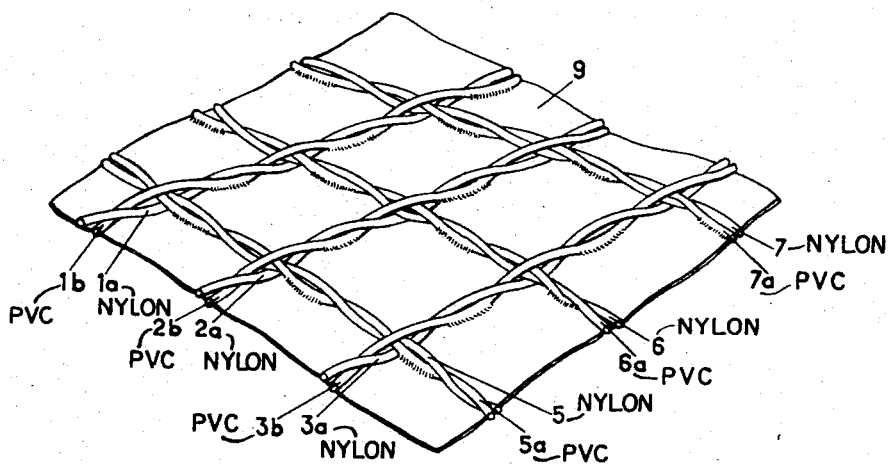
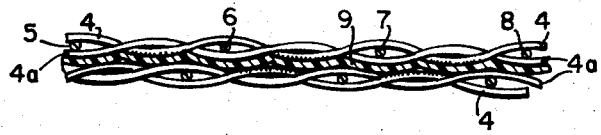
FIG.7
INVENTOR
Yves H. Dalle
ATTORNEYS

United States Patent Office 3,072,512
Patented Jan. 8, 1963

3,072,512
STRETCHABLE REINFORCED SHEET MATERIAL
Yves Hubert Dalle, Wervicq-Sud, France, assignor to Societe Anonyme dite: Societe Narsom Tissage de Jute de la Lys et Societe Industrielle et Commerciale de la Catiche Reunis, Wervicq-Sud, France, a corporation of France
Filed Nov. 25, 1959, Ser. No. 855,379
Claims priority, application France Nov. 27, 1958
11 Claims. (Cl. 154—46)

The materials used up to this day for packing bulk products, such as chemical products, grains, flour, etc., have not generally been satisfactory. In effect, most of these packages have been made of natural textile fibers which rapidly deteriorated when wet, unless first subjected to a special treatment, which increased the price thereof.

Attempts have also been made to use sheets of plastic materials, but the packages so made exhibited the drawback of becoming excessively deformed and offering only an insufficient strength.

The present invention has for its object to provide a new material particularly adapted for packing bulk products, but also capable of being used in many other fields, said material being essentially characterized by the fact that it comprises a net at least one of the weft or warp threads of which consists of a yarn made from a heat weldable plastic material or a yarn sheathed with such a material, said net being heat-welded on a plastic material sheet.

In one preferred embodiment of the present invention, the net is made of yarns made from a nylon plastic material and coated with a sheath of polyvinyl chloride, said net being heat-welded on a thin sheet of polyvinyl chloride.

In a second preferred embodiment of the present invention, the net is obtained by a gauze weaving, one of the two warp webs being constituted by nylon yarns sheathed with a polyvinyl chloride layer, the other warp web and the weft being constituted by unsheathed nylon yarns, the net so obtained being heat-welded to a polyvinyl chloride sheet.

While in the first preferred embodiment of this invention all the yarns of the net are welded to the plastic material sheet, which insures the adhesion of the entire net surface to the polyvinyl chloride sheet, in the second preferred embodiment of the invention welding of the net to the polyvinyl chloride sheet is merely made at the locations where the yarns of the net which are sheathed with polyvinyl chloride are in contact with the sheet made from this same plastic material.

In a third preferred embodiment of the invention, the net is obtained by a gauze weaving, one of the warp webs being constituted by nylon yarns, the other warp web being constituted by polyvinyl chloride yarns, the weft being constituted by a nylon thread about which is wound a polyvinyl chloride yarn, the net so obtained being heat-welded to a polyvinyl chloride sheet at every point where a polyvinyl chloride yarn is in contact with said sheet.

As a modification, the present invention has also for its object to provide materials in which a polyvinyl chloride sheet is heat-welded on each face of a net of anyone of the recited kinds, as well as materials constituted by a polyvinyl chloride sheet on each face of which is welded a net of the aforementioned kind.

The materials according to this invention have very particular qualities, chiefly so far as fluid tightness and shock resistance are concerned. If, for example, a bag made from the material according to this invention is filled with grains or tubers and if such bag so loaded is submitted to severe shocks, e.g. by dropping the same on the ground, it is found that in those parts of the material according to the invention which are subjected to the greatest tensile force, the net yarns are progressively broken, but the plastic material sheet is not ruptured, and the great elasticity and distortion capacity of said plastic sheet allow the contents of the bag to undergo important displacements after having broken the net.

Thus, when abnormal forces are applied to bags made with the material according to the present invention, they result only in breaking the net yarns at the locations subjected to the highest strains, the plastic material sheet still insuring the fluid tightness of the bag by providing it with a substantial capacity for yielding without breaking at those points.

Another object of this invention is to provide a device to heat-weld the net on the plastic material sheet, such device being essentially characterized by the fact that it comprises two heat sources, preferably of the infrared radiation type, between which said plastic sheet and net are caused to travel, together with two heat-insulating screens which may be interposed between said heat sources and the products to be welded, in case of a shutdown of the machine fabricating the net.

In an alternative form of said device, the net and the plastic material sheet are calendered between two unheated calendering rolls after travelling past infrared lamps.

In order that this invention be fully understood, two embodiments thereof will be now described as illustrative and non-limiting examples, with reference to the annexed drawings, in which:

FIG. 1 shows schematically a material according to the invention;

FIG. 2 is an enlarged section taken from the line II—II in FIG. 1;

FIG. 3 is a perspective view of another embodiment of the material according to this invention;

FIG. 4 is a perspective view of an embodiment of this invention in which only nylon yarns and polyvinyl chloride yarns are used;

FIG. 5 is a schematic section of the device by means of which the heat-welding of the net and the plastic material sheet may be effected;

FIG. 6 is a cross-section view showing a net sandwiched between two sheets of polyvinyl chloride; and FIG. 7 is a cross-sectional view showing two nets attached on opposite sides of a single sheet of polyvinyl chloride.

Referring first to FIGS. 1 and 2, the net is schematically shown by its warp yarns 1, 1a, 2, 2a, 3, 3a and 4, 4a, gauze woven in the known manner, and by its weft yarns, such as 5, 6, 7 and 8. There is also shown the plastic material sheet 9 on which the net is heat-welded.

All the yarns of the net illustrated in FIG. 1 are constituted by a nylon yarn, which is coated with a polyvinyl chloride sheath. Sheet 9 is also made from polyvinyl chloride.

As it is well known, the polyvinyl chloride has the inherent property of being heat-weldable at a relatively low temperature which is of the order of 302° F. to 392° F.

Thus, the material according to this invention shown in FIG. 1 is constituted by a net all the yarns of which are welded to the polyvinyl chloride sheet by virtue of their sheath, which results in an excellent adhesion of the net upon said sheet.

Another embodiment of the material according to the present invention shown in FIG. 3 is also constituted by a gauze woven net and by a plastic sheet made from polyvinyl chloride. But while in the first embodiment illustrated in FIGS. 1 and 2 all the yarns of the net are constituted by nylon yarn coated with polyvinyl chloride, in this second embodiment shown in FIG. 3 the weft yarns 5, 6 and 7 are made from a non-coated nylon yarn, as well as the web 1a, 2a and 3a of the warp yarns constituting the net.

Conversely, the second web 1, 2, 3, etc., of the warp yarns is made of nylon yarns coated with a polyvinyl chloride layer.

It results from this organization of the net that upon the heat-welding operation the yarns such as 1a, 2a, 3a, 5, 6, 7, etc., do not adhere to the polyvinyl chloride sheet 9 and that only the yarns 1, 2 and 3 which are sheathed adhere to said polyvinyl chloride sheet 9 at the locations where they are in contact therewith, such locations being indicated in FIG. 3 by shading which represents schematically the welding.

It can be seen that, in the embodiment shown in FIG. 3 and in contradistinction to the embodiment in FIG. 1, the net is fixed to the polyvinyl chloride sheet only at spaced points.

The advantage of the embodiment shown in FIG. 3 resides in the fact that the manufacture price of this material is materially less than that of the material according to the first embodiment while having substantially the same mechanical characteristics.

In effect, sheathing a nylon yarn entails an important increase in the cost of manufacture thereof but results only in a very low enhancement of the mechanical qualities of the yarn. Consequently, when non-coated yarns replace an important proportion of yarns which were coated in the case of the first embodiment, a very substantial economy is realized, and moreover the strength of the yarns may be enhanced by increasing the diameter of the nylon yarns which are practically the only ones to impart strength to the material.

In the embodiment shown in FIG. 4, the warp web 1a, 2a, 3a is made from nylon yarns, while the other warp web 1b, 2b, 3b is made from polyvinyl chloride yarns and not from nylon yarns coated with polyvinyl chloride as was the case in the previously described embodiments.

The weft, according to the embodiment in FIG. 4, is constituted by nylon yarns, such as 5, 6 and 7, about which polyvinyl chloride yarns 5a, 6a and 7a are wound.

In carrying out the welding of the net so obtained and of the polyvinyl chloride sheet 9, only those portions of the yarns, such as 1b, 2b, 3b, 5a, 6a, 7a, etc., which are in contact with said sheet 9 become welded to the latter. The weld spots are schematically represented by shading in FIG. 4.

It can be seen that, in this embodiment, the weft as well as the warp of the net are constituted by two kinds of yarns having a different character, namely, yarns intended to impart the strength (in the present case nylon yarns) and polyvinyl chloride yarns intended to cause the net to adhere to the plastic sheet 9.

FIG. 5 shows schematically the device by means of which the net may be heat-welded to the plastic sheet 9.

To carry out the heat-welding operation, the sheet 9 and the net 10 are caused to travel vertically in a downward direction so as to pass between infrared radiating heating sources 11 and 12, the power of which is adjusted so as to cause the net and the sheet to become heat-welded one to the other.

There are provided thermal screens 13 and 14 which are used to protect sheet 9 and net 10 from the radiation as shown in FIG. 5 upon a shut-down of the machine weaving the net.

Upon resuming the running of the device, said screens 13 and 14 are removed by lifting the same in the direction of arrow 15.

It is to be understood that the embodiments hereinbefore described and shown in the drawings have only an illustrative and non-limiting character, and that those skilled in the art may impart to the same any desirable modifications without departing from the scope of the invention herein involved and as defined in the appended claims.

In particular, it is evident that, although in the cases shown in the drawings the net has been represented as being made by means of a gauze weaving, said net may be made by means of any other open weave.

It is equally evident that it is possible, without departing from the scope of this invention, to make a net by mixing yarns of a very different character, provided only that some of these yarns are heat-weldable to the plastic sheet upon which it is desired to fix the net, the character of the non heat-weldable yarns being chosen according to the qualities which are desirable to impart to the material.

Similarly, it is possible, without departing from the scope of this invention, to manufacture materials having a greater strength and constituted by a plurality of nets superposed in an alternate fashion with a plurality of plastic sheets.

It is also to be understood that the present invention is not limited to the use of yarns coated with polyvinyl chloride and of polyvinyl chloride sheets, but that it can be extended to all the fibers and sheets made from a heat-weldable material and having otherwise appropriate characteristics.

Finally, it is clear that the new materials which are the object of this invention may be used for various purposes and that the invention is not limited to packing materials.

What I claim is:

1. A sheet material comprising a sheet of a heat weldable plastic material reinforced by a network of threads, said network being composed of discrete elongated elements some of which are made of a heat weldable plastic material heat sealed to said sheet and others of which are made from a strong stretch resistant material which remains separate from and movable with respect to said sheet material even when heated sufficiently to bond said heat-weldable elements thereto, at least some of said heat-weldable elements extending in cooperating paired relationship with said stretch resistant elements.

2. A sheet material as claimed in claim 1 in which said heat weldable elements are sheaths encircling the stretch resistant elements.

3. A sheet material as claimed in claim 1 in which said heat weldable and stretch-resistant elements are formed as intertwined pairs of threads.

4. A stretchable reinforced sheet material comprising a thin sheet of a relatively weak, stretchable plastic material reinforced by means of an open mesh net of crossed threads, at least some of said threads comprising lengths of a relatively strong and inextensible first material encircled by lengths of a second material having approximately the same strength and stretchability as the material of said thin sheet, said second material being one which can be more readily heat bonded to that of said thin sheet than can said first material to either said second material or said thin sheet, the thread lengths of said second material being heat bonded to said thin sheet and capable of stretching with said sheet by sliding relative to said first mentioned thread lengths when said sheet is placed under tension.

5. A reinforced sheet as claimed in claim 4 in which said first mentioned thread lengths are encased within said second mentioned thread lengths.

6. A reinforced sheet as claimed in claim 4 in which said first and second mentioned thread lengths are intertwined.

7. A reinforced sheet as claimed in claim 4 in which said first mentioned thread lengths are nylon and said second mentioned thread lengths and said sheet are polyvinyl chloride.

8. A reinforced sheet as claimed in claim 4 in which said thin sheet and said second mentioned thread lengths are of the same material.

9. A stretchable reinforced sheet material as claimed in claim 4 in which a thin sheet of plastic material is bonded to both sides of said net.

10. A stretchable reinforced sheet material as claimed in claim 4 in which a net is bonded to both sides of said thin plastic sheet.

11. A stretchable reinforced sheet material comprising a thin sheet of a relatively weak, stretchable plastic material reinforced by means of an open mesh net of transversely disposed threads of a relatively strong and inextensible first material, those of said threads extending in one direction only being encircled by lengths of a second material having approximately the same strength and stretchability as the material of said thin sheet, said second material being one which can be more readily heat bonded to that of said thin sheet than can said first material to either said second material or said thin sheet, the thread lengths of said second material being heat bonded to said thin sheet and capable of stretching with said sheet by sliding relative to said first mentioned thread lengths when said sheet is placed under tension, those of said threads extending in the other direction passing between at least portions of those threads extending in said one direction and the thin sheet, so as to be held against said sheet by said last mentioned threads.

References Cited in the file of this patent

UNITED STATES PATENTS

| | | |
|---|---|---|
| 2,230,182 | Eaton | Jan. 28, 1941 |
| 2,233,477 | Hilberg | Mar. 4, 1941 |
| 2,281,635 | Strauss | May 5, 1942 |
| 2,332,373 | Dorough et al. | Oct. 19, 1943 |
| 2,713,551 | Kennedy | July 19, 1955 |
| 2,742,391 | Warp | Apr. 17, 1956 |
| 2,851,389 | Lappala | Sept. 8, 1958 |
| 2,867,891 | Horton et al. | Jan. 13, 1959 |
| 2,939,200 | Ewing et al. | June 7, 1960 |
| 2,942,327 | Corry | June 28, 1960 |

UNITED STATES PATENT OFFICE
CERTIFICATE OF CORRECTION

Patent No. 3,072,512  January 8, 1963

Yves Hubert Dalle

It is hereby certified that error appears in the above numbered patent requiring correction and that the said Letters Patent should read as corrected below.

In the grant, lines 2 to 4, and lines 14 and 15, and in the heading to the printed specification, lines 4 to 6, name of assignee, for "Societe Anonyme dite: Societe Narsom Tissage de Jute de la Lys et Societe Industrielle et Commerciale de la Catiche Reunis", each occurrence, read -- Societe Anonyme dite: Societe Norsom Lissage de Jute de la Lys et Societe Industrielle et Commerciale de la Catiche Reunis --.

Signed and sealed this 1st day of October 1963.

AL)
est:

ST W. SWIDER esting Officer

DAVID L. LADD

Commissioner of Patents